United States Patent
Mathews et al.

(10) Patent No.: US 7,424,584 B2
(45) Date of Patent: Sep. 9, 2008

(54) KEY-CONTROLLED OBJECT-BASED MEMORY PROTECTION

(75) Inventors: Thomas S. Mathews, Austin, TX (US); Bruce Mealey, Austin, TX (US); Pratap Chandra Pattnaik, Ossining, NY (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 10/916,981

(22) Filed: Aug. 12, 2004

(65) Prior Publication Data
US 2006/0036823 A1    Feb. 16, 2006

(51) Int. Cl.
G06F 12/00    (2006.01)
G06F 9/26    (2006.01)

(52) U.S. Cl. .................. 711/164; 711/203; 711/206
(58) Field of Classification Search .............. 711/164, 711/203, 206
See application file for complete search history.

(56) References Cited

U.S. PATENT DOCUMENTS

| | | | |
|---|---|---|---|
| 5,335,334 A | | 8/1994 | Takahashi et al. |
| 5,619,671 A | * | 4/1997 | Bryant et al. ............... 711/202 |
| 5,724,551 A | | 3/1998 | Greenstein et al. .......... 395/491 |
| 5,737,575 A | | 4/1998 | Blaner ........................ 395/491 |
| 5,754,761 A | * | 5/1998 | Willsey ....................... 726/30 |
| 5,787,309 A | | 7/1998 | Greenstein et al. |
| 5,802,397 A | * | 9/1998 | Greenstein et al. ............ 710/36 |

(Continued)

FOREIGN PATENT DOCUMENTS

EP    425771 A2 *  5/1991

OTHER PUBLICATIONS

"Dual Bit Key Protects Read Only and Supervisory Control Program Only Writable Storage," IBM Technical Disclosure Bulletin, Sep. 1973, pp. 1275-1276, available at http://www.delphion.com/tdbs/tdb?o=73C%2001843 as of Feb. 27, 2004.

(Continued)

Primary Examiner—Reginald G. Bragdon
Assistant Examiner—Aracelis Ruiz
(74) Attorney, Agent, or Firm—Matthew W. Baca; Amy J. Pattillo

(57) ABSTRACT

A method, system, and program key-controlled object-based memory protection are provided. A processing unit includes an authority check for controlling access by the processing unit to pages of memory according to whether a hardware protection key set currently loaded in an authority mask register allows access to the pages. In particular, each page of memory is assigned a page key number that indexes into the hardware protection key set. The currently loaded hardware protection key set specifies those page key numbers that are currently accessible to the processing unit for the execution context. Each hardware key within the hardware protection key set may be associated with a particular data object or group of data objects. Thus, effectively, the currently loaded hardware protection key set identifies which data objects or groups of data objects are currently accessible. Software keys are assigned to data objects and dynamically mapped to hardware protection key sets, such that when a module is called, the software keys assigned to that module are mapped to the hardware protection key set to be loaded for controlling current access to memory.

7 Claims, 3 Drawing Sheets

U.S. PATENT DOCUMENTS

| | | | |
|---|---|---|---|
| 5,802,590 | A | 9/1998 | Draves et al. |
| 5,809,551 | A | 9/1998 | Blandy ........................ 711/170 |
| 5,918,251 | A * | 6/1999 | Yamada et al. .............. 711/207 |
| 6,715,050 | B2 * | 3/2004 | Williams et al. ............ 711/164 |
| 2001/0052073 | A1 * | 12/2001 | Kern et al. .................. 713/161 |
| 2003/0115476 | A1 * | 6/2003 | McKee ........................ 713/193 |
| 2004/0170046 | A1 * | 9/2004 | Belnet et al. ................. 365/145 |

OTHER PUBLICATIONS

"Object Based Storage", White Paper, Intel, copyright ,2003, pp. 1-15.

* cited by examiner

KEY-CONTROLLED OBJECT-BASED MEMORY PROTECTION

BACKGROUND OF THE INVENTION

1. Technical Field

The present invention relates in general to improved memory protection and in particular to improved object-based memory protection. Still more particularly, the present invention relates to providing key-controlled object-based memory protection, where keys are assigned at a page level granularity to indicate page association with a data object and each module is allowed access to the pages assigned to at least one data object.

2. Description of the Related Art

It is common for computer software to be programmed to use a flat address space within memory. In particular, the flat address space may be implemented within a global address space that is shared among multiple software components. The global address space provides an easy programming mode and efficient memory access performance.

Within a computer system, it is important that the components of an operating system and other program components are protected from one another's activities. In particular, when a global address space is shared among multiple software components, it is important to ensure that memory, files, and other objects can be operated on by only those components that have gained proper authorization from the operating system.

One reason that protection of memory and other objects is important is that there is a need to prevent mischievous, intentional violation of memory and other objects. In addition, protection of memory and other objects is important to protect against accidental memory overlays that degrade data.

One method of providing memory protection for a flat address space is by updating page table entries holding a memory address for each page of memory with a page protector specifying the access allowed to each page by a current module as that module is loaded for execution. Changing memory protection by changing page protectors in page table entries, however, is extremely time consuming. In particular, the page protector for a single page may be stored in multiple locations, such as a translation lookaside buffer, cache, and page table, wherein changing the protection levels of memory requires changing the page protector value in multiple buffers and memory locations which is both time consuming and an inefficient manner of changing memory protection.

To avoid the time consuming nature of changing memory protection at the page table level, some operating systems implement memory hierarchies for memory protection. In particular, in a hierarchical memory scheme, memory is arranged in a hierarchy, such that each software component can be programmed to have access to a particular ring within the hierarchy and all rings surrounding the particular ring. A core component, such as an operating system kernel may be programmed to be fully addressable, with access to the core of the hierarchical rings access to all memory rings; other components are programmed to have limited addressability to a particular ring or rings.

Within a hierarchical memory protection scheme, memory protection can be adjusted by changing the memory included in a ring, without requiring updates to the page table and buffers, however existing software components are not organized to support hierarchical memory. Thus, hierarchical memory schemes are limited because software modules must be restructured to fit into a hierarchical memory protection scheme. In addition, organizing memory in a hierarchical fashion is limited because the way that memory must be grouped into protection levels does not necessarily correlate with object-oriented software components.

Therefore, in view of the foregoing, there is a need for a method, system, and program for an efficient and inexpensive memory protection scheme that organizes and protects pages of memory allocated within a flat, global address space. In particular, there is a need for a method, system, and program to quickly change the protection level of a page of memory without requiring a change of a protection key in the page table and buffers.

SUMMARY OF THE INVENTION

Therefore, the present invention provides improved memory protection and in particular provides improved object-based memory protection. Still more particularly, the present invention provides a method, system, and program for key-controlled object-based memory protection, where keys are assigned at a page level granularity to indicate page association with a data object and each module is allowed access to the pages assigned to at least one data object.

According to one embodiment, a processing unit includes an authority check. The authority check controls access by the processing unit to pages of memory according to whether a hardware protection key set currently loaded in an authority mask register allows access to the pages. In particular, each page of memory is assigned a page key number that indexes into the hardware protection key set. The currently loaded hardware protection key set specifies those page key numbers that are currently accessible to the processing unit for the execution context. Each hardware key within the hardware protection key set may be associated with a particular data object or group of data objects. Thus, effectively, the currently loaded hardware protection key set identifies which data objects or groups of data objects are currently accessible.

Software keys are assigned to a data object or group of data objects. Programmers may specify the sets of software keys needed by each module. At initialization, each software key assigned to a module is dynamically mapped to one from among multiple hardware protection keys. Then, the set of software protection keys assigned to each module is mapped to a hardware protection key set for the module at initialization. When a processing unit enters a new module, the hardware protection key set for the module is efficiently loaded into the authority mask register, such that sets of keys for controlling memory protection are quickly changed. In particular, modules may be wrapped with a protection gate that controls loading the hardware protection key set when a new module is entered. In one example, protection gate may store the hardware protection key set previously loaded for quick restoration of the authority mask register at an exit point.

In particular, when a page request is received from the processing unit at the authority controller, a translation look-aside buffer is searched for the page request. If a page entry for the page request is located in the translation look-aside buffer, then the key number stored with the page entry is retrieved. Otherwise, a page table is accessed to retrieve the key number for the page request. The key number is then compared with the hardware protection key set to determine if access to pages assigned to that key number is allowed. If the hardware protection key set allows the access, the page protection bit is also checked to determine if access to the page is allowed.

In one embodiment, the hardware protection key set is a bit vector indexed to the page key numbers. In addition, the hardware protection key set may be indexed to the page key numbers for read requests and indexed to the page key numbers for write requests. A bit set at each of the indexed page key number locations specifies whether a particular type of access is allowed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The key-controlled object-based memory protection method, system, and program allow for efficient adjustment of the data objects accessible to the currently loaded module by assigning page key numbers associated with data objects at a page level granularity and controlling access to those pages of memory assigned with page key numbers as specified by a hardware protection key set efficiently loaded in association with the currently loaded module. In particular, it is important to note that modules are groups of instructions defined at a granularity such that software keys may be assigned to a module. Multiple groups of modules may be referred to as a software component. Components may include, but are not limited to, application programs, kernel processes, procedures, services, methods, and other groups of modules that are executable on a processing unit.

Figure 1:
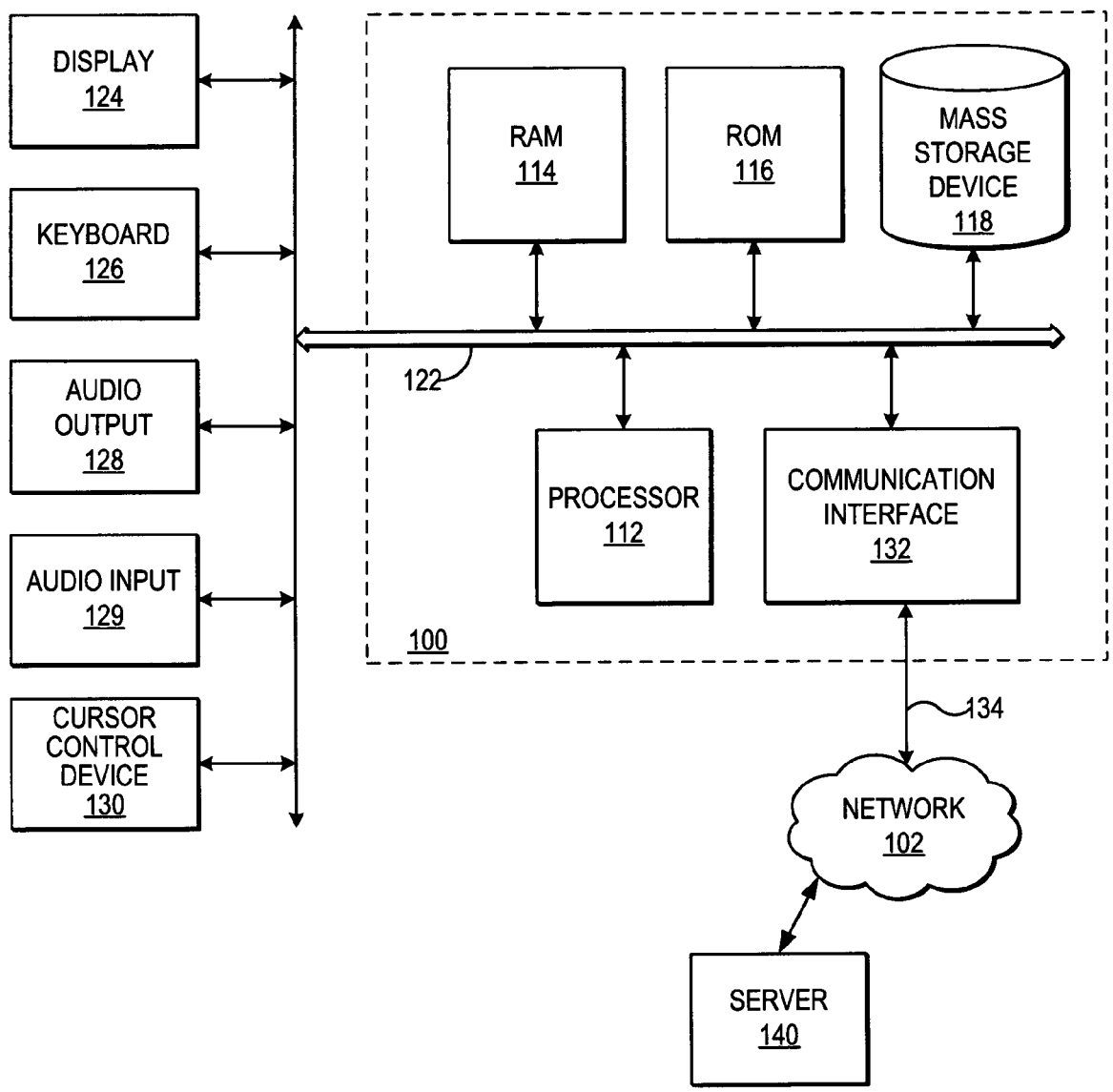
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In one embodiment, application or operating system software contains machine executable instructions that when executed on processor 112 carry out the operations depicted in the flowcharts of FIGS. 5, 6, 7, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
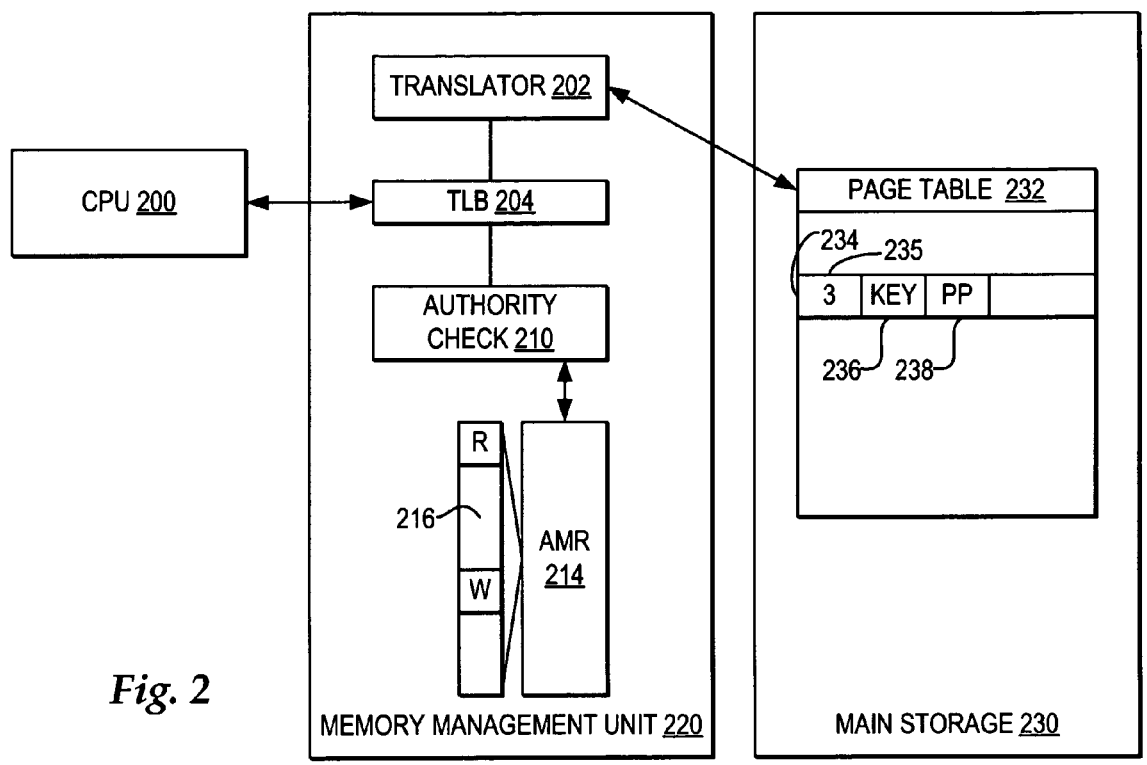
FIG. 2 is a more detailed block diagram of the processing and memory components of a computer system which provide key-controlled object-based memory protection.

With reference now to FIG. 2, a more detailed block diagram of the processing and memory components of a computer system which provide key-controlled object-based memory protection. As depicted, computer system 100 includes multiple central processing units (CPUs), such as a CPU 200, for processing CPU programs and a main storage 230 for storing programs and data. In particular, main storage 230 is organized into pages of memory, where an address or frame number for each page's physical location in main storage 230 is stored one of multiple page tables, such as a page table 232. Main storage 230 may include RAM, caches, and other available storage devices. In addition, the address for each page of memory, such as the page entry identified at reference numeral 234, includes a physical page number 235, a page key 236 and a page protector (PP) bit 238. As will be further described, page key 236 is a multiple bit field that identifies a protection key with which the page is associated. PP bit 238 can be set to define a page to be read-write, read-only, or no access, for example.

CPU 200 sends memory address access requests, typically in the form of a logical or virtual address, which may include a page number and page offset, to a translation lookaside buffer (TLB) 204. In the example, TLB 204 and other components are depicted within a memory management unit 220 outside CPU 200, however, it will be understood that memory management unit 220 may be a component within CPU 200 or an independent component. Further, it will be understood that one method of memory management within a computer system is the use of TLB 204 in conjunction with page tables and translation units, however, in alternate embodiments, alternate memory management infrastructure may be implemented.

TLB 204 stores page numbers and translated frame numbers for previously translated page numbers. In addition, according to the present invention, TLB 204 stores the page key and may store the page protector bit for a page. If the page number in the requested logical address from CPU 200 is located in TLB 204, a TLB hit occurs and the frame number (or physical address) for the page number is accessed from TLB 204. If the page number in the requested logical address is not located in TLB 204, then a TLB miss occurs and translator 202 performs dynamic address translation. In particular, translator 202 accesses page tables 232 and computes the physical address for the page. In addition, the page key and PP for the page are retrieved and stored in TLB 204.

An authority check 210 determines whether the execution context in which a request for access to memory is received is allowed access. For each memory access request, the page key and PP for the requested page are accessed and passed from TLB 204 to authority check 210. Then, authority check 210 determines whether to allow a current execution context to access a page of memory and what type of access to allow by comparing the page key with a hardware protection key set currently loaded into authority mask register (AMR) 214. In addition, authority check 210 determines whether the PP bit is set to allow the requested access. It is important to note that while authority check 210 is depicted as a component of memory management unit 220, the operation of authority check 210 may be performed by CPU 200 or may be performed by an independent controller. Further, it is important to note that while authority check 210 is depicted at the hardware level, authority check 210 may be performed within a software layer, such as a software emulation of a CPU.

In the example, AMR 214 holds a bit vector 216, where bit vector 216 illustrates one structure of a hardware protection key set. In one embodiment, the first half of the bits in bit vector 216 specify the write authority mask and the second half of the bits in bit vector 216 specify the read authority mask. Bits in each half of AMR 214 are indexed by hardware key numbers. For example, a 64-bit vector is designated by 32 hardware key numbers, each mapped to both the write authority mask and the read authority mask. The bit settings of the read hardware key number and write hardware key number of bit vector 216 are searched by a current page key to determine whether a program access is allowed. For example, if the bits of a page key indicate page key "3", then the value in the position of the bit vector indexed to hardware key number "3" is retrieved, depending on whether the request is for a read or write operation. If the value retrieved is a "0", for example, then the request is allowed if also allowed by the PP bit setting, but if the value retrieved is a "1", for example, the request is not allowed regardless of the PP bit setting.

It is important to note that updates to the bit vector loaded in AMR 214 are fast and that updates may be performed as control passes between modules. In particular, software keys are assigned to data objects or specific regions of memory. Modules are assigned sets of software keys by programmers to designate the data objects that each module needs to access. At initialization, the kernel maps each of the assigned software keys to one of the hardware keys. In the example, each software key would be mapped to one of the 32 hardware keys. When the CPU switches modules, a hardware protection key set mapped to from the software key set for the module is loaded into AMR 214. Advantageously, by protecting memory according to the hardware protection key set currently loaded in AMR 214, access to pages can be changed by efficiently changing the value of a bit vector, rather than requiring time consuming adjustments to keys in page table 232 and TLB 204. Further, by protecting memory according to the settings of a hardware protection key set, memory is not limited to hierarchical accesses, but rather any module may be programmed to have access to any data object or set of data objects.

In addition, it is important to note that in the example, memory is defined to assign page keys at a page boundary, or in other words at a page level of granularity. In other embodiments, page keys may be assigned at other levels of granularity. Advantageously, however, by assigning page keys at a page level of granularity, individual pages can be associated with a data object, rather than associating groups of pages with a particular level of a memory hierarchy.

Figure 3:
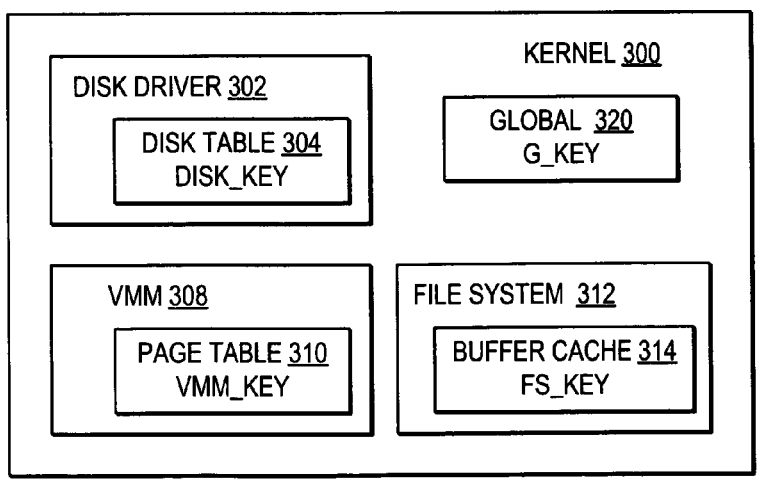
FIG. 3 is a block diagram illustrating the operating system view of data objects and processes organized for memory protection.

Referring now to FIG. 3, there is depicted a block diagram illustrating the operating system view of data objects and modules organized for memory protection in accordance with the method, system, and program of the present invention. As depicted, a kernel 300 includes multiple modules that perform different functions. The kernel views each module in association with a private memory space viewed as a data object. In addition, each module may access a shared memory, designated in the example as global memory 320.

In the example, a selection of the modules depicted includes the modules for a disk driver 302, a virtual memory manager (VMM) 308, and a file system 312. The associated private data objects depicted are a disk table 304, a page table 310 and a buffer cache 314. It will be understood that private data objects may also be shared across multiple components of the kernel. Further, it will be understood that the private data objects are distributed within a flat addresses space.

Multiple software keys may be defined where each software key is assigned to describe a particular data object or memory region. Software keys may be statically defined for an operating system or may be dynamically allocated through an application programming interface (API).

In the example, a software key is assigned to describe each of the data objects. For example, disk table 304 is assigned software key "disk_key", page table 310 is assigned software key "vmm_key", and buffer cache 314 is assigned software key "fs_key". In addition, global memory 320 is assigned software key "gkey". Table 1 illustrates examples of software keys mapped to memory regions accessible to kernel modules.

TABLE 1

Data Objects Mapped to Software Keys

| Software Key | Data Objects |
| --- | --- |
| DISK_KEY | disk table |
| VMM_KEY | page table |
| FS_KEY | file system |
| G_KEY | global |

Programmers may assign a software key or set of software keys needed by each module. At initialization, the operating system may gather the software keys assigned to modules and map each assigned software key to one of multiple hardware protection keys. In general, there may be more software keys than hardware protection keys, such that the operating system may assign a particular hardware key to multiple software keys that are associated with similar data objects. As a result, each hardware protection key may be associated with a region of memory that includes multiple data objects mapped to multiple software keys. In addition, the operating system may assign page keys to the pages of memory to identify the regions of memory associated with each hardware protection key at a page level granularity.

In one example, Table 2 illustrates the software key to hardware protection key mapping that may be performed. In the example, the "disk_key" and the "fs_key" are both mapped to hardware protection key "1". Thus, the operating system may mark the pages of memory corresponding to the disk table and the file system with a page key that indexes into hardware protection key "1". It is important to note that while the example depicted describes modules of a kernel and the data objects accessed by modules of a kernel, in alternate embodiments, program application modules and the data objects associated with those program application data objects may implement the present invention of mapping software keys to hardware protection keys.

TABLE 2

Software Keys Dynamically Mapped to Hardware Protection Keys

| Software Key | Hardware protection key |
| --- | --- |
| DISK_KEY | Hardware protection key 1 |
| VMM_KEY | Hardware protection key 2 |
| FS_KEY | Hardware protection key 1 |
| GLOBAL_KEY | Hardware protection key 3 |

In addition, at initialization, the operating system may determine the hardware protection key set required by a module. In particular, at initialization, once the software keys are mapped to hardware protection keys, the software key set for each module may be mapped to a hardware protection key set and stored in an initialization table. Table 3 illustrates one example of hardware protection key sets mapped to from the software key sets assigned to each module. In the example, disk driver module 302 is assigned the software key set including "disk_key" and "global_key" that map to hardware protection keys "1" and "3", respectively. Thus, a hardware protection key set for disk driver module 302 indicates the hardware protection keys allowed for the disk driver module are "1" and "3". It will be understood that when loaded into the AMR, the hardware protection key set will include a full bit vector with the positions indexed to hardware protection keys "1" and "3" set to allow access.

TABLE 3

Hardware Protection Key Sets mapped for each module

| Module | Software Key Set | Hardware Protection Key Set |
| --- | --- | --- |
| Disk Driver | DISK_KEY, GLOBAL_KEY | 1, 3 |
| VMM | VMM_KEY, GLOBAL_KEY | 1, 2 |
| File System | FS_KEY, GLOBAL_KEY | 1, 3 |

It is important to note that by implementing object-based memory protection, errors that occur in one module can be more easily detected and maintained within the object-based memory region accessed by the module. For example, in an operating system, rather than mapping all the data objects used by the modules of the operating system into a single global address space where problems in one module can easily propagate throughout the global space, each data object is protected at the page level from interference from errors in modules that do not have access to the pages of that data object.

Figure 4:
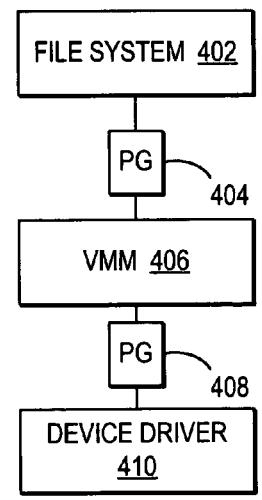
FIG. 4 is an illustration of a protection gate for updating the authority masking register when a process call crosses load module boundaries.

With reference now to FIG. 4, there is depicted an illustration of a protection gate for updating the authority masking register when a module call crosses module boundaries. As depicted, when the load module shifts from calling file system 402 to VMM 406, a protection gate 404 is invoked by VMM 406. Another protection gate 408 is invoked by device driver 410, for example, when the load module shifts from calling VMM 406 to device driver 410.

Figure 7:
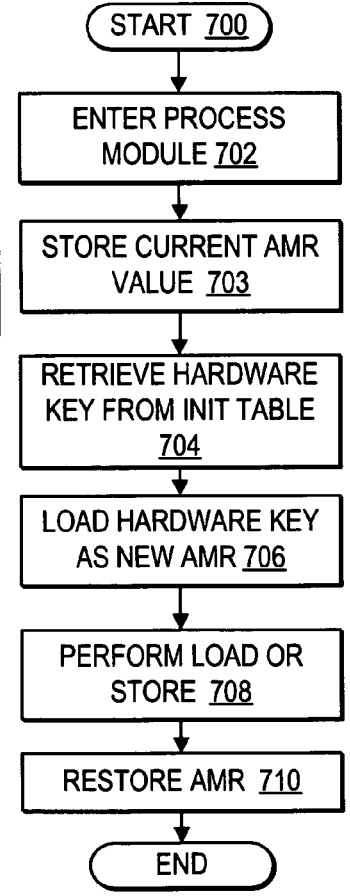
FIG. 7 is a high level logic flowchart of a process and program for controlling a protection gate.

Protection gates are functions that include steps such as those described in FIG. 7 and are managed by the called module. In particular, all entry and exit points of a module are wrapped with protection gates, such as protection gates 404 and 408. Protection gates change the AMR value as modules are entered and exited by changing the hardware protection key set currently loaded in the AMR. In one example, a protection gate may store AMR values when a processing units enters a new modules, such that when the new module reaches an exit point, the AMR stored on entry may be restored.

While protection gates are managed by the called module, protection gate wrapping may be added by the operating system or by the programmer. In one embodiment, the operating system may insert the protection gate code around the entry and exit points. In particular, the protection gate code may be inserted either when the module is loaded or when the module is bound. In another embodiment, the protection gate code may be included by the programmer of the module.

Figure 5:
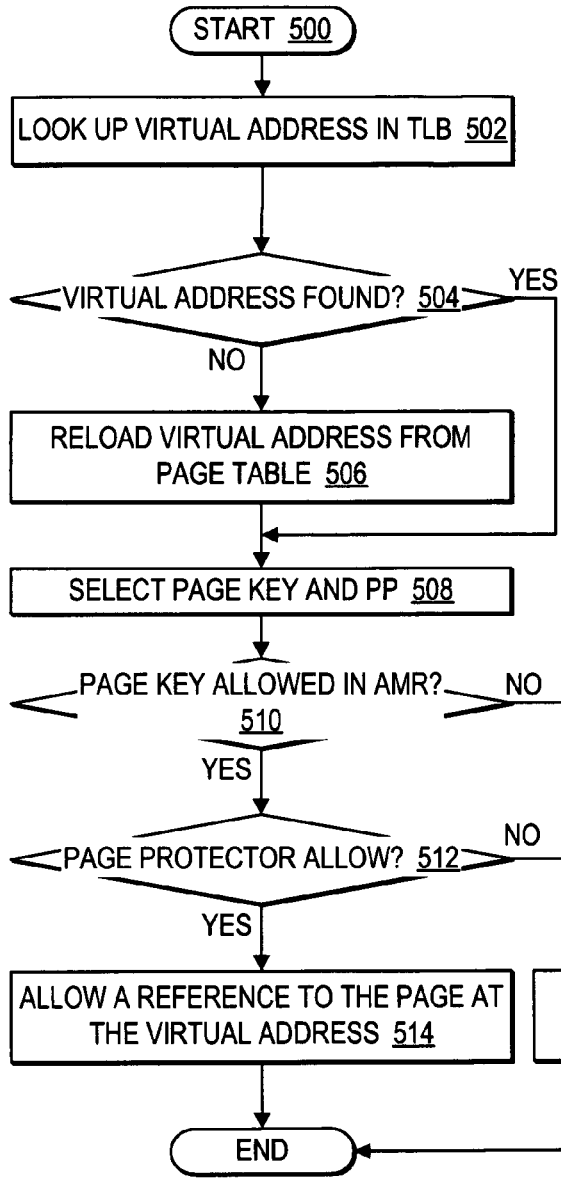
FIG. 5 is a high level logic flowchart of a process and program for controlling an authority check to determine whether access to a copy of a page is allowed.

Referring now to FIG. 5, there is depicted a high level logic flowchart of a process and program for controlling an authority check to determine whether access to a copy of a page is allowed. As depicted, the process starts at block 500 and thereafter proceeds to block 502. Block 502 depicts looking up a virtual address in the TLB for a received page access request. Next, block 504 depicts a determination whether a virtual address is found. If a virtual address is found, then the process passes to block 508. If a virtual address is not found, then first the process passes to block 506. Block 506 depicts reloading the virtual address from the page table, and the process passes to block 508.

Block 508 depicts selecting the page key and PP from the TLB for the virtual address. Next, block 510 depicts a determination whether the page key is allowed access in the AMR. If the page key is not allowed access in the AMR, then the process passes to block 516. Block 516 depicts returning an error and the process ends. Otherwise, at block 510, if the page key is allowed access in the AMR, then the process passes to block 512. Block 512 depicts a determination whether the PP bit allows access. If the PP bit does not allow access, then the process passes to block 516. If the PP bit does allow access then the process passes to block 514. Block 514 depicts allowing a reference to the page at the virtual address for the load or store access requested and the process ends.

Figure 6:
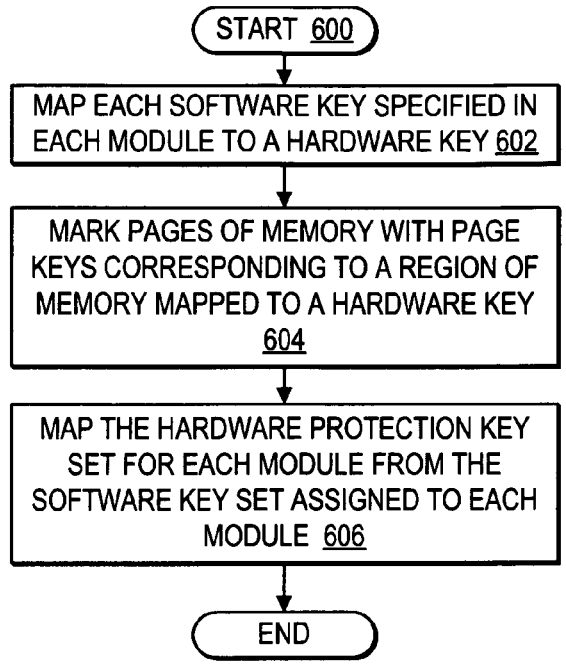
FIG. 6 is a high level logic flowchart of a process and program for controlling initialization mapping of software keys to hardware protection key sets.

With reference now to FIG. 6, there is depicted a high level logic flowchart of a process and program for controlling memory protection initialization in accordance with the method, system, and program of the present invention. As depicted, the process starts at block 600 and thereafter proceeds to block 602. Block 602 depicts mapping each software key to a hardware protection key. In particular, if there are less software keys than hardware protection keys, then each software key may map to a unique hardware protection key. However, if there are more software keys than hardware protection keys, multiple software keys may be mapped to the same hardware protection key, where similar software keys may be mapped together to the same hardware protection key. Next, block 604 depicts marking the pages of memory in the page table with the page keys corresponding to the regions of memory effectively mapped to a hardware key. Thereafter, block 606 depicts mapping the hardware protection key set for each module from the software key set assigned to each module, and the process ends. In particular, the hardware protection key set associated with each module may be stored in an initialization table or added to the entry point of each module.

Referring now to FIG. 7, there is depicted a high level logic flowchart of a process and program for controlling a protection gate in accordance with the method, system, and program of the present invention. As depicted, the process starts at block 700 and thereafter proceeds to block 702. Block 702 depicts entering a module. Next, block 703 depicts storing the current AMR value. Then, block 704 depicts retrieving the hardware protection key set from the initialization table. Thereafter, block 706 depicts loading the new hardware protection key set value in the AMR and block 708 depicts performing the load or store operations. Then, block 710 depicts restoring the AMR to the prior hardware protection key set, and the process ends. It will be understood that in other embodiments, protection gates may change the state of the AMR in alternate manners.

What is claimed is:

1. A method for memory protection based on data objects, comprising:

assigning to each of a plurality of pages of memory within a separate entry for each page within a page table of said memory a separate key number from among a plurality of key numbers distinguishable from a page number for each of said plurality of pages, wherein each selection of pages of memory assigned a same key number from among said plurality key numbers are associated with a same region of said memory associated with a particular key number, wherein each of said plurality of key numbers is associated with at least one from among a plurality of data objects, by:

assigning a separate software key from among a plurality of software keys to each separate data object of said plurality of data objects;

mapping, in selections of at least one, each of said plurality of software keys to at least one key number from among a plurality of key numbers, wherein each of said plurality of key number is associated with a separate region of memory from among a memory unit;

assigning to each of said plurality of pages of memory within said separate entry for each page within said page table of said memory said separate key number from among a plurality of key numbers associated with said separate region of memory to which each page of said memory is associated;

mapping a separate hardware protection key set for each module from among a plurality of modules from a separate selection of said key numbers assigned to a selection of software keys from among said plurality of software keys assigned to each said separate module; and responsive to loading a particular module in said processing unit from among a plurality of modules, loading a particular hardware protection key set mapped for said particular module into said memory management unit for controlling access to said memory; and only allowing a processing unit to access a particular selection of pages from among said plurality of pages according to a currently loaded hardware protection key set in a memory management unit controlling accesses to said memory, wherein said currently loaded hardware protection key set identifies a selection of key numbers from among said plurality of key numbers that are currently accessible to said processing unit.

2. The method according to claim 1 for memory protection based on data objects, further comprising:

responsive to determining that a particular page is accessible according to said currently loaded hardware protection key set, only allowing access to said particular page if a page protector bit set for said particular page allows a type of access requested for said particular page.

3. The method according to claim 1 for memory protection based on data objects, further comprising:
loading said currently loaded hardware protection key set in a register accessible to an authority controller, wherein said authority controller determines and controls access by said processing unit to said selection of pages from among said plurality of pages.

4. The method according to claim 1 for memory protection based on data objects, further comprising:
loading said currently loaded hardware protection key set when said processing unit enters a first module;
responsive to said processing unit entering a second module, efficiently replacing a value of said currently loaded hardware protection key set to a second selection of key numbers accessible to said second module.

5. The method according to claim 1 for memory protection based on data objects, further comprising:
receiving a page request from said processing unit at an authority controller, wherein said authority controller controls access by said processing unit to said memory;
searching, by said authority controller, a translation look-aside buffer for said page request, wherein for each page entry said translation look-aside buffer stores a page number, a translated frame number for said page number, and a key number accesses with said page number;
responsive to locating a page entry for said page request in said translation look-aside buffer, retrieving to said authority controller a particular key number stored in said page entry for said page request from said translation look-aside buffer;
responsive to not locating a page entry for said page request in said translation look-aside buffer, accessing by said authority controller said page table in said memory to retrieve a particular key number for said page request; and
determining whether said currently loaded hardware protection key set allows access to said particular key number.

6. The method according to claim 1 for memory protection based on data objects, wherein said currently loaded hardware protection key set is a bit vector indexed to said plurality of key numbers.

7. The method according to claim 1 for memory protection based on data objects, wherein said currently loaded hardware protection key set is a bit vector indexed to said plurality of key numbers for read access and indexed to said plurality of key numbers for write access.

* * * * *